(12) United States Patent
Sivaraman et al.

(10) Patent No.: US 12,122,523 B2
(45) Date of Patent: Oct. 22, 2024

(54) SYSTEMS AND METHODS FOR RADIANT HEAT REFLECTIVE AIRCRAFT EVACUATION SYSTEMS

(71) Applicant: Goodrich Corporation, Charlotte, NC (US)

(72) Inventors: Rajamanikandan Sivaraman, Bangalore (IN); Parthasarathy Govindaraju, Bangalore (IN); Chana Kesava Reddy, Bengaluru (IN)

(73) Assignee: GOODRICH CORPORATION, Charlotte, NC (US)

(*) Notice: Subject to any disclaimer, the term of this patent is extended or adjusted under 35 U.S.C. 154(b) by 104 days.

(21) Appl. No.: 17/856,563

(22) Filed: Jul. 1, 2022

(65) Prior Publication Data
US 2023/0312114 A1     Oct. 5, 2023

(30) Foreign Application Priority Data
Apr. 1, 2022   (IN) .............................. 202241019966

(51) Int. Cl.
*B64D 25/14*   (2006.01)
*B64F 5/10*    (2017.01)
*D06M 15/564*  (2006.01)

(52) U.S. Cl.
CPC ............. *B64D 25/14* (2013.01); *B64F 5/10* (2017.01); *D06M 15/564* (2013.01); *D06M 2200/25* (2013.01)

(58) Field of Classification Search
CPC ...... B64D 25/14; B64F 5/10; D06M 2200/25; D06M 15/564
See application file for complete search history.

(56) References Cited

U.S. PATENT DOCUMENTS

| 8,663,762 B2 | 3/2014 | Mazany et al. | |
| 2012/0315407 A1* | 12/2012 | Mazany | B82Y 30/00 |
| | | | 977/734 |
| 2014/0134355 A1* | 5/2014 | Mazany | D06N 3/0059 |
| | | | 442/141 |
| 2017/0022658 A1* | 1/2017 | Fang | D06N 3/0034 |
| 2017/0174298 A1* | 6/2017 | Duggal | B64D 25/14 |

FOREIGN PATENT DOCUMENTS

| CN | 106741971 | 1/2019 |
| EP | 3094484   | 6/2018 |
| EP | 3121329   | 11/2018 |
| KR | 102306039 | 9/2021 |

OTHER PUBLICATIONS

European Patent Office, European Search Report dated Sep. 4, 2023 in Application No. 23165625.7.

* cited by examiner

*Primary Examiner* — Tye William Abell
(74) *Attorney, Agent, or Firm* — SNELL & WILMER L.L.P.

(57) ABSTRACT

An aircraft evacuation slide assembly may be comprised of a plurality of composite textiles. Each composite textile may comprise a fabric substrate, an inner polyurethane coating, and an outer heat reflective coating. The outer heat reflective coating may comprise nanofillers that improve polymer properties, such as mechanical, barrier, thermal, flame retardancy, and electrical properties. Moreover, the outer heat reflective coating may comprise nanofillers that enable hot air welding and radio frequency welding of the plurality composite textiles to form the aircraft evacuation slide assembly.

18 Claims, 6 Drawing Sheets

SYSTEMS AND METHODS FOR RADIANT HEAT REFLECTIVE AIRCRAFT EVACUATION SYSTEMS

CROSS-REFERENCE TO RELATED APPLICATIONS

This application claims priority to, and the benefit of, India Patent Application No. 202241019966, filed Apr. 1, 2022 (DAS Code 3CB2) and titled "SYSTEMS AND METHODS FOR RADIANT HEAT REFLECTIVE AIRCRAFT EVACUATION SYSTEMS," which is incorporated by reference herein in its entirety for all purposes.

FIELD

The following disclosure relates to aircraft evacuation systems, more specifically, aircraft evacuation systems fabric materials.

BACKGROUND

An evacuation slide assembly may include an inflatable slide that helps passengers disembark from an aircraft in the event of an emergency or other evacuation event. Polymer coated fabrics are typically used in the manufacture of aircraft evacuation system slides and rafts. Aluminum particles may be dispersed in polyurethane (PU) coating compounds that are integrated into the fabrics. The fabrics may be composite structures in which woven nylon base cloth is sandwiched between PU coatings. The inner coating may be an air retentive coating. The outer coating may be a radiant heat reflective coating.

SUMMARY

A composite textile is disclosed herein. In various embodiments, the composite textile may comprise a fabric substrate, an inner polyurethane coating, and an outer heat reflective coating. In various embodiments, the outer heat reflective coating may comprise nanofillers. In various embodiments, the nanofillers may be configured to be mixed into the outer heat reflective coating.

In various embodiments, the outer heat reflective coating may comprise ceramic nanoparticles. In various embodiments, the outer heat reflective coating may comprise carbon allotropes. In various embodiments, the outer heat reflective coating may comprise graphite flakes. In various embodiments, the outer heat reflective coating may comprise graphene nanosheets. In various embodiments, the outer heat reflective coating may be configured to be bonded to the fabric substrate. In various embodiments, the outer heat reflective coating may comprise nano metal particles. In various embodiments, the fabric substrate may be comprised of nylon.

An aircraft evacuation slide assembly is also disclosed herein. In various embodiments, the assembly may comprise an inert gas inflation system and an evacuation slide. In various embodiments, the evacuation slide may be comprised of a plurality of composite textiles. Each composite textile of the plurality of composite textiles may be configured to be joined to one another. In various embodiments, each composite textile may comprise a fabric substrate. In various embodiments, the composite textile may comprise an inner polyurethane coating. In various embodiments, the composite textile may comprise an outer heat reflective coating. In various embodiments, the outer heat reflective coating may comprise nanofillers. In various embodiments, the nanofillers may be configured to be mixed into the outer heat reflective coating.

In various embodiments, the outer heat reflective coating may comprise ceramic nanoparticles. In various embodiments, the outer heat reflective coating may comprise carbon allotropes. In various embodiments, the outer heat reflective coating may comprise graphite flakes. In various embodiments, the outer heat reflective coating may comprise graphene nanosheets. In various embodiments, the outer heat reflective coating may be configured to be bonded to the fabric substrate. In various embodiments, the outer heat reflective coating may comprise nano metal particles. In various embodiments, the fabric substrate may be comprised of nylon.

A method of manufacturing an aircraft evacuation slide is also disclosed herein. In various embodiments, the method may comprise assembling a plurality of composite textiles. In various embodiments, the assembly of each composite textile may further comprise forming an outer heat reflective coating. In various embodiments, the forming may further comprise mixing a nanofiller compound in a polyurethane coating. In various embodiments, the assembling of each composite textile may comprise applying the outer heat reflective coating to a first surface of a fabric substrate. In various embodiments, the assembling of each composite textile may comprise applying an inner polyurethane coating to a second surface of the fabric substrate. In various embodiments, the assembling of each composite textile may comprise bonding the outer heat reflective coating and the inner polyurethane coating to the fabric substrate. In various embodiments, the method may further comprise joining the plurality of composite textiles to one another, wherein the joining is configured to form the aircraft evacuation slide.

In various embodiments, the applying the outer heat reflective coating may further comprise coating the fabric substrate with the outer heat reflective coating. In various embodiments, the applying the inner polyurethane coating may further comprise coating the fabric substrate with the inner polyurethane coating. In various embodiments, the joining may further comprise radio frequency welding the plurality of composite textiles to one another. In various embodiments, the joining may further comprise hot air welding the plurality of composite textiles to one another.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

Figure 1:
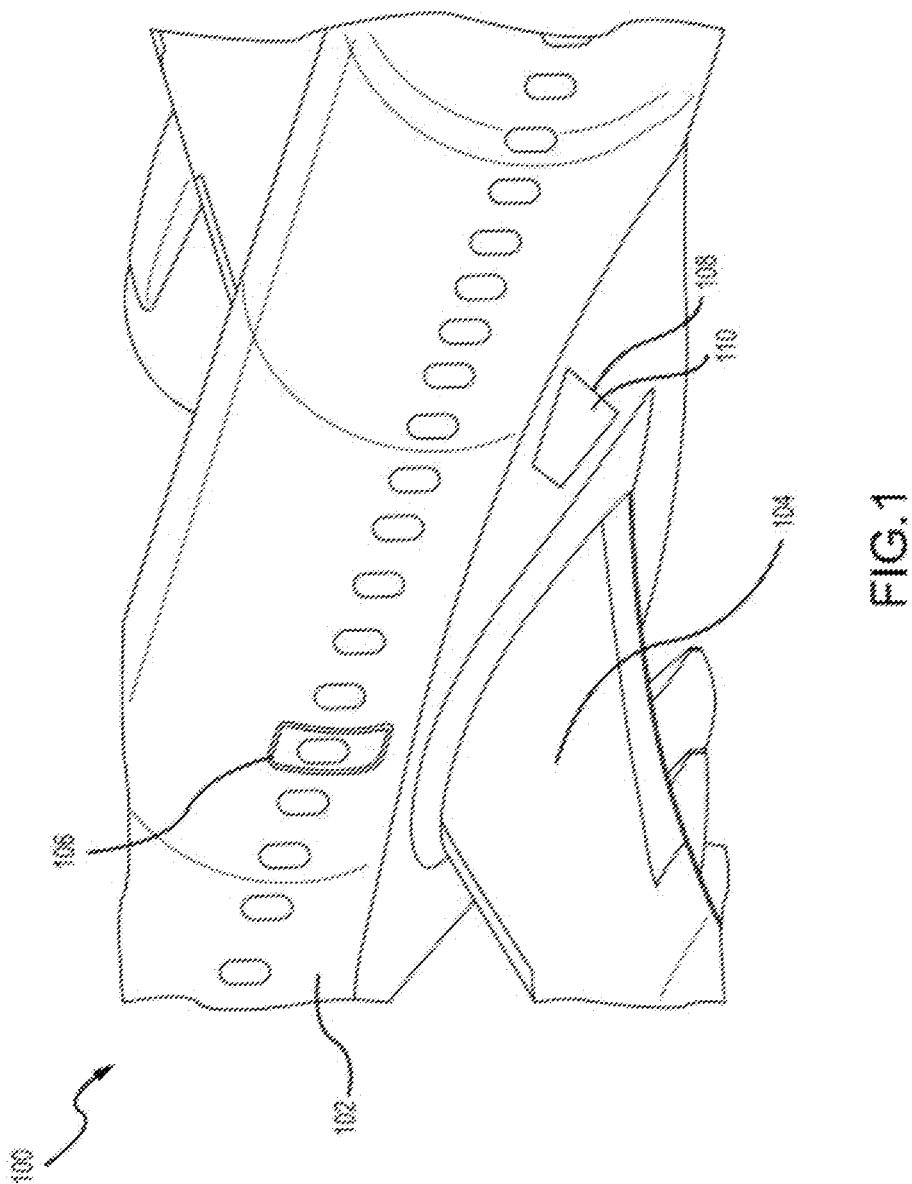
FIG. 1 illustrates an aircraft, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Polymer coated fabrics may be used in evacuation slide and raft systems. Coated fabrics may be composite structures comprising a woven fabric substrate sandwiched between polyurethane (PU) polymer coatings on either side of the fabric substrate. The coated fabrics may be integrated into inflatable evacuation slides and rafts by various fabrication techniques, such as, for example, adhesive bonding, heat sealing, inductive welding, radio frequency (RF) welding, and the like.

In various embodiments, the PU coatings may possess air retentive characteristics and radiant heat reflective characteristics. Heat reflective PU coatings may comprise nanofillers disposed in the coatings. Nanofillers may improve polymer properties, such as mechanical, barrier, thermal, flame retardancy, and electrical properties. Moreover, nanofillers may enable modification of polymer morphology. It may be advantageous for aircraft evacuation slides and rafts to be comprised of coated fabrics comprising fillers that may improve the thermal radiant heat characteristics of the coating, improve the coating's mechanical properties, and impart flame retardant characteristics. Moreover, it may be advantageous to disperse or mix nanofillers in coatings, which may enable hot air welding and RF welding of coated fabrics. These nanofillers may also be lightweight and reduce reliance on chemicals, adhesives, and solvents to bond the coated fabric. Accordingly, these heat reflective PU coatings may reduce emission of volatile organic compounds (VOCs) to the environment and may reduce days for manufacturing the evacuations slides and rafts.

Referring to FIG. 1, an exemplary aircraft 100 is shown, in accordance with various embodiments. Aircraft 100 may comprise a fuselage 102 with wings 104 fixed to fuselage 102. Emergency exit door 106 may be disposed on fuselage over wing 104 such that passengers exiting emergency exit door 106 would exit onto wing 104. An evacuation slide assembly 108 may be disposed aft of emergency exit door 106. Blowout panel 110 may cover evacuation slide assembly 108 when installed on the aircraft 100. In various embodiments, the evacuation slide assembly 108 may include and/or be housed within a packboard mounted to the aircraft 100. The evacuation slide assembly 108 may jettison the blowout panel 110 and deploy an evacuation slide 200 (FIG. 2), such as an inflatable slide, in response to emergency exit door 106 opening or in response to another evacuation event.

Figure 2:
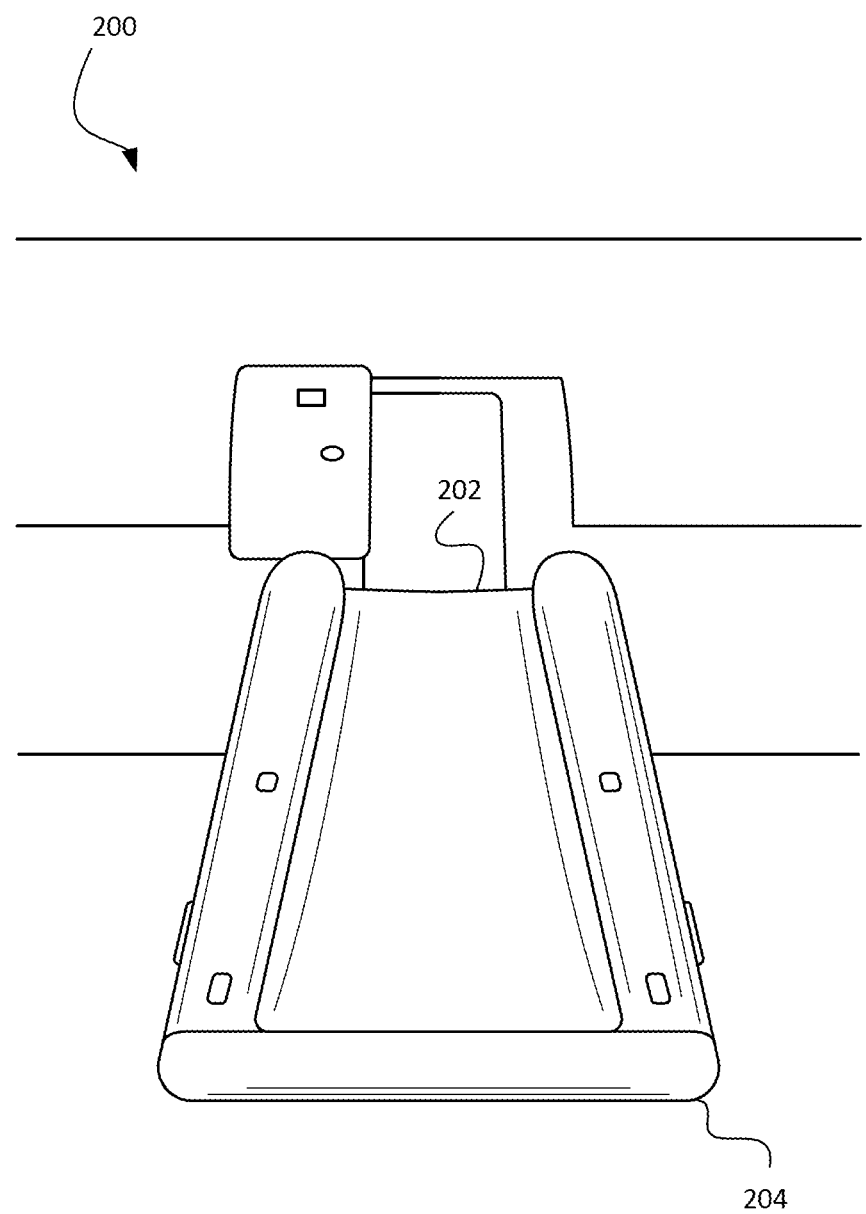
FIG. 2 illustrates an aircraft evacuation slide, in accordance with various embodiments.

FIG. 2 illustrates an aircraft evacuation slide assembly 200 in accordance with various embodiments. In various embodiments, the assembly 200 may comprise an inert gas inflation system 202 and an evacuation slide 204. The inert gas inflation system 202 may enable inflation of the evacuation slide 204 in the event of an emergency.

Figure 3:
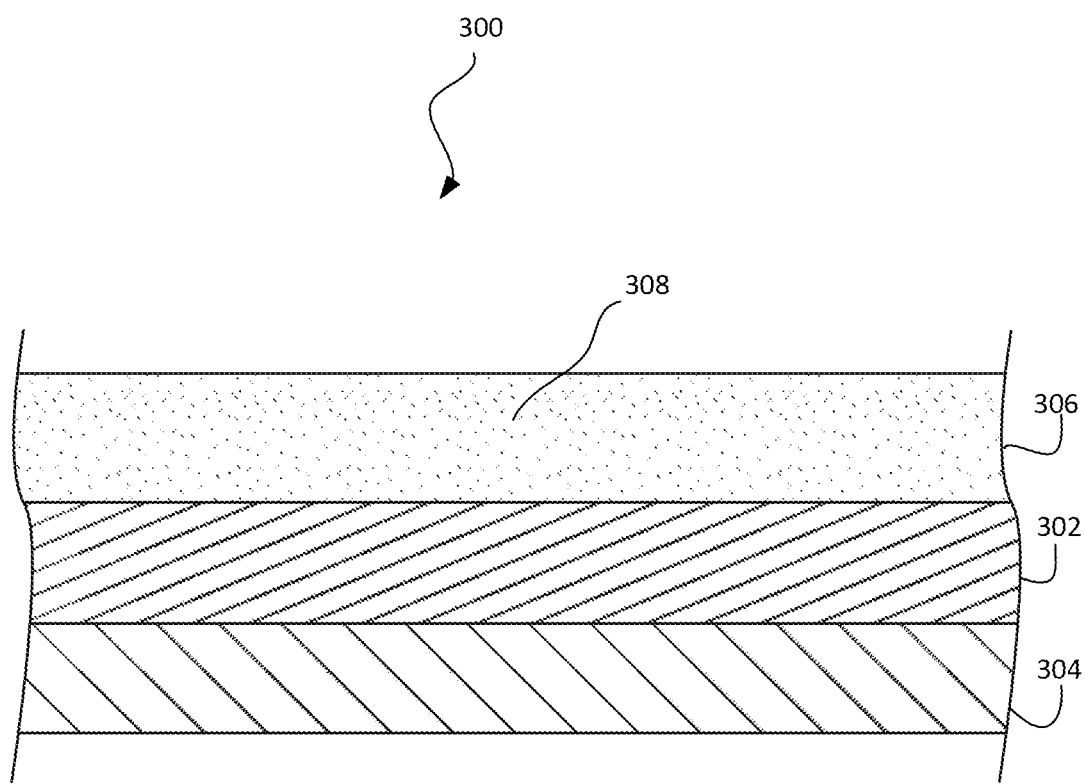
FIG. 3 illustrates a cross-section of a composite textile, in accordance with various embodiments.

In various embodiments, the evacuation slide 204 assembly may be comprised of a plurality of composite textiles. As shown in FIG. 3, in various embodiments, each composite textile 300 may comprise a fabric substrate 302. In various embodiments, the fabric substrate 302 may be comprised of nylon, polybutylene terephthalate (PBT), polyethylene naphthalate, and the like.

In various embodiments, the composite textile 300 may comprise an inner polyurethane (PU) coating 304. A PU coating may be a layer applied to the surface of a substrate and may be configured to protect the substrate. For example, a PU coating may protect a substrate from defects such as corrosion, weathering, abrasion, and like deterioration. In various embodiments, a PU coating may be substantially waterproof, preventing water from penetrating a fabric substrate. For aircraft evacuation slides and rafts, it may be advantageous for the slide or raft to comprise an air retentive PU coating. In various embodiments, a PU coating, in a single or multi-layer, may prevent air held in an enclosed space from dissipating through the fabric and into the atmosphere. For evacuation slides and rafts, the inner PU coating 304 may be configured for an inner surface of the slide (204, FIG. 2) or raft.

In various embodiments, the composite textile 300 may further comprise an outer heat reflective coating 306. In various embodiments, the outer heat reflective coating 306 may comprise nanofillers mixed into the coating. Nanofillers may be mixed into the coating when the coating is in its soluble stage. Nanofillers may be additives in solid form. In various embodiments, nanofillers may differ from the polymer matrices to which they may be added in terms of their composition and structure. In various embodiments, nanofillers may be configured to improve the mechanical and physical properties of a polymer. Nanofillers may be one-dimensional, having one dimension less than 100 nanometers (nm). One-dimensional nanofillers may be formed in sheets of 1 to 2 nm thickness. One-dimensional nanofillers may be useful in electrical and thermal applications due to their singular dimensionality.

Nanofillers may be two-dimensional, having two dimensions less than 100 nm. Two-dimensional nanofillers may be shaped as tubes, fibers, or filaments. Two-dimensional nanofillers may impart strong flame-retardant properties to a polymer. Nanofillers may be three-dimensional, having spherical, cubical, or crystalline configurations. Many three-dimensional nanofillers may be useful in coatings applications due to their transparency in visible light.

As shown in FIG. 3, in various embodiments, the outer heat reflective coating 306 may comprise ceramic nanoparticles 308. Ceramic nanoparticles 308 may possess beneficial thermal properties such as elevated heat capacity and thermal conductivity. For example, aluminum nitride may exhibit a thermal conductivity of 160 watts per meter Kelvin (W/mK), whereas the thermoplastic polyurethane may exhibit a thermal conductivity of 0.2 (W/mK). Moreover, ceramic nanoparticles 308 may store, dissipate, and/or effuse a radiant heat flux applied to the fabric substrate 302 during, for example, heat sealing or radio frequency (RF) welding. For example, aluminum nitride may exhibit a thermal effusivity of 19.65 $(Ws^{1/2}/m2K) \times 10^3$, whereas the thermoplastic polyurethane may exhibit a thermal effusivity of 0.60 $(Ws^{1/2}/m2K) \times 10^3$.

Moreover, ceramic nanoparticles 308 may be electrically insulating due to their dielectric properties. For example, ceramic nanoparticles 308 may comprise a high dielectric constant and low dissipation factor, which may prevent arcing. The addition of ceramic nanoparticles 308 may be advantageous in that a small number of ceramic nanoparticles 308 may suffice to impart the requisite thermal properties to support hot air welding and RF welding of the polyurethane coated fabric substrate 302. For example, the addition of nanofillers, such as the ceramic nanoparticles 308, may enable joining a plurality of composite textiles to one another using hot air welding and/or RF welding techniques to form an evacuation slide. Additionally, ceramic nanoparticles 308 dispersed within the outer heat reflective coating 306 may possess a high surface area, enabling effective resistance to a radiant heat flux. Ceramic nanoparticles 308 may be, for example, aluminum nitride (AlN), silicon nitride (Si3N4), boron nitride (BN), Alumina, and/or combinations thereof.

Figure 4:
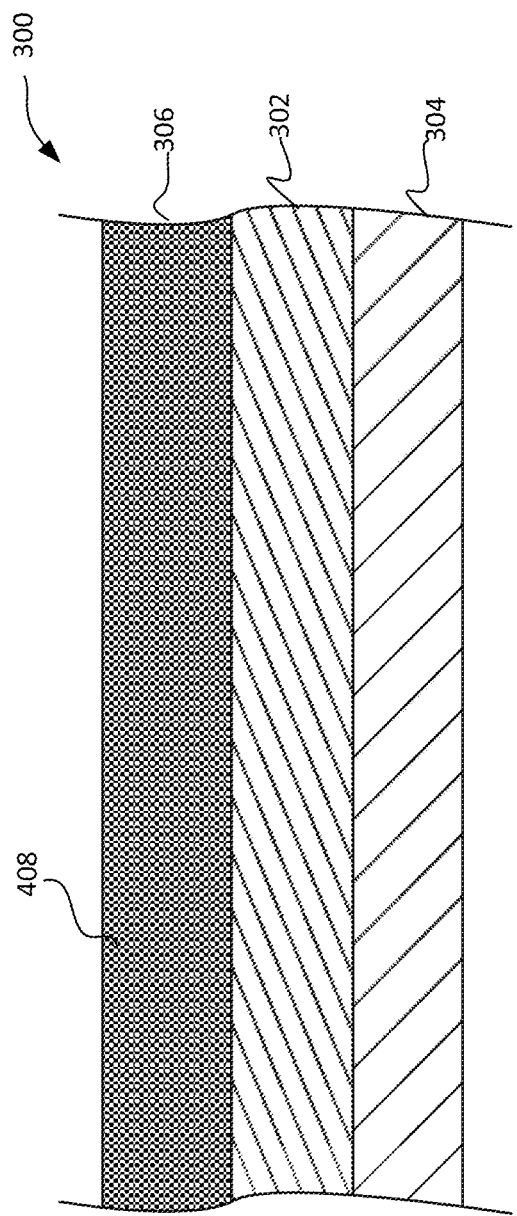
FIG. 4 illustrates a cross-section of the composite textile, in accordance with various embodiments.

Referring to FIG. 4, the composite textile 300 is shown in accordance with various embodiments. In various embodiments, the heat reflective coating 306 may comprise carbon allotropes 408. Carbon allotropes 408 may be, for example, carbon nanotubes (CNTs). CNTs may have a cylindrical nanostructure wherein carbons are hybridized with neighboring atoms resembling a graphitic structure. In various embodiments, the heat reflective coating 306 may comprise graphite flakes. In various embodiments, the heat reflective coating 306 may comprise graphene nanosheets.

In various embodiments, dispersing a small amount of carbon allotropes 408 in the outer heat reflective coating 306 may improve radiant heat characteristics of the coating 306. Carbon allotropes 408 may comprise high thermal conductivity and electrical conductivity. For example, graphene may exhibit a thermal conductivity of 4000 (W/mK), whereas the thermoplastic polyurethane may exhibit a thermal conductivity of 0.2 (W/mK). The carbon allotropes 408 may comprise a high dielectric constant. In various embodiments, the carbon allotropes 408 may enable a molecular structure to break the movement of free electrons in the outer heat reflective coating 306. The addition of carbon allotropes 408 may be advantageous in that a small amount of carbon allotropes 408 may suffice to impart the requisite thermal properties to support hot air welding and RF welding of the polyurethane coated fabric 302. Specifically, a high polymer content ratio may aid in bonding or joining the radiant heat reflective coated fabric 302 using hot air welding and RF welding techniques. Moreover, carbon allotropes 408 mixed into the outer heat reflective coating 306 may possess a high surface area, enabling effective resistance to a radiant heat flux.

Figure 5:
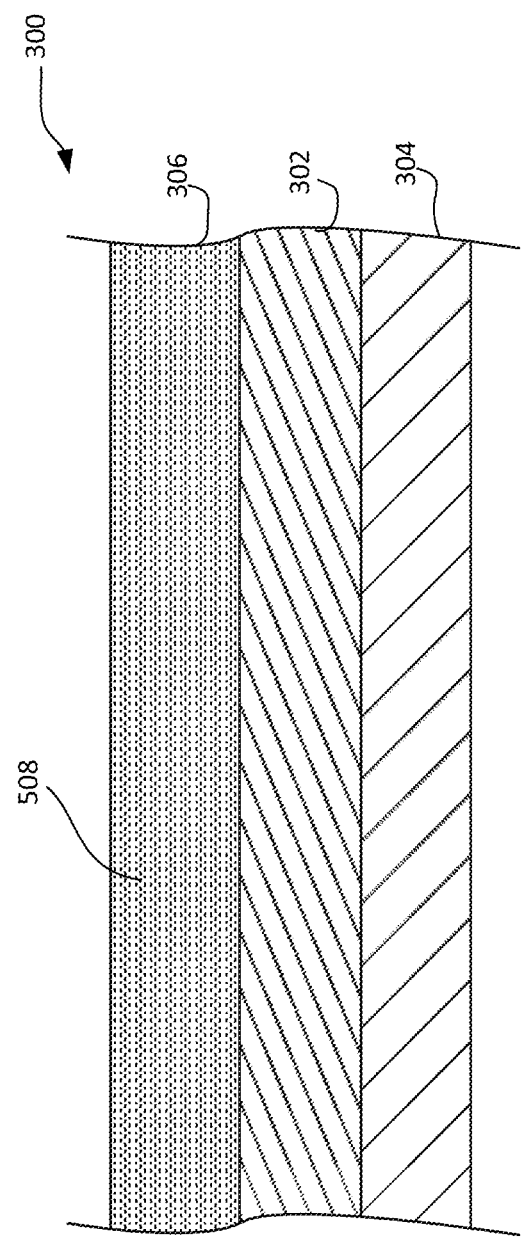
FIG. 5 illustrates a cross-section of the composite textile, in accordance with various embodiments.

Referring to FIG. 5, the composite textile 300 is shown in accordance with various embodiments. In various embodiments, the outer heat reflective coating 306 may comprise nano metal particles 508. The nano metal particles 508 may be mixed into the heat reflective coating 306 to improve the radiant heat characteristics of the coated fabric substrate 302. In various embodiments, the nano metal particles 508 may comprise a high thermal and electrical conductivity. For example, aluminum may exhibit a thermal conductivity of 190 (W/mK), whereas the thermoplastic polyurethane may exhibit a thermal conductivity of 0.2 (W/mK).

Moreover, the nano metal particles 508 may be modified to act as a high dielectric in the heat reflective coating 306 to break the movement of free electrons in the heat reflective coating 306. The addition of nano metal particles 508 may be advantageous in that a small amount of nano metal particles 508 may suffice to impart the requisite thermal properties to support hot air welding and RF welding of the polyurethane coated fabric 302. Specifically, a high polymer content ratio may aid in bonding the radiant heat reflective coated fabric 302 using hot air welding and RF welding techniques. Moreover, nano metal particles 508 dispersed within the outer heat reflective coating 306 may possess a high surface area, enabling effective resistance to a radiant heat flux. Nano metal particles 508 may be, for example, nano-sized aluminum, copper, silver, tungsten, and/or combinations thereof. The nano metal particles 508 may be mixed into the outer heat reflective coating 306 such that the nano metal particles are evenly distributed throughout the outer heat reflective coating 306.

Figure 6:
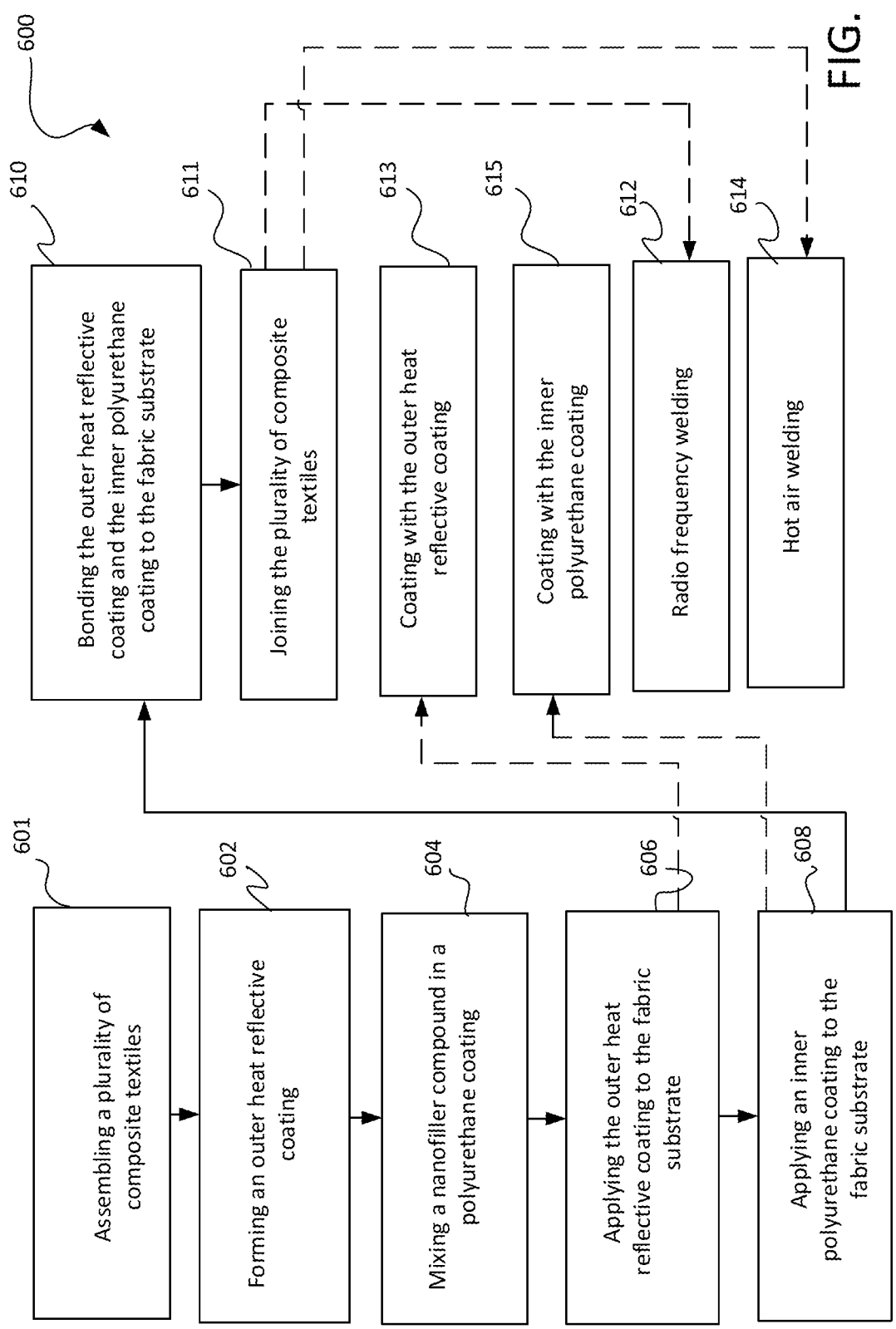
FIG. 6 illustrates a method of manufacturing an aircraft evacuation slide, in accordance with various embodiments.

Referring to FIG. 6, a method of manufacturing (step 600) an aircraft evacuation slide is shown. The method (step 600) may comprise assembling (step 601) a plurality of composite textiles. The assembling (step 601) of each composite textile may further comprise forming (step 602) an outer heat reflective coating. In various embodiments, the forming (step 602) may further comprise mixing (step 604) a nanofiller compound in a polyurethane coating. In various embodiments, the assembling (step 601) may comprise applying (step 606) the outer heat reflective coating to a first surface of a fabric substrate. In various embodiments, the assembling (step 601) may comprise applying (step 608) an inner polyurethane coating to a second surface of the fabric substrate. In various embodiments, the assembling (step 601) may comprise bonding (step 610) the outer heat reflective coating and the inner polyurethane coating to the fabric substrate. In various embodiments, the method (step 600) may further comprise joining (step 611) the plurality of composite textiles to one another, wherein the joining may be configured to form the aircraft evacuation slide.

In various embodiments, the applying (step 606) the outer heat reflective coating may further comprise coating (step 613) the fabric substrate with the outer heat reflective coating. In various embodiments, the applying (step 608) the inner polyurethane coating may further comprise coating (step 615) the fabric substrate with the inner polyurethane coating. Both the outer heat reflective coating and the inner polyurethane coating may be applied to the fabric substrate by any other suitable application methods, such as, for example, brushing or spraying. In various embodiments, the joining (step 611) may further comprise radio frequency welding (step 612) each composite textile of the plurality of composite textiles to one another. In various embodiments, the joining (step 611) may further comprise hot air welding (step 614) each composite textile of the plurality of composite textiles to one another.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A composite textile, consisting of:
a fabric substrate;
an inner polyurethane coating applied to a first surface of the fabric substrate; and
an outer heat reflective coating applied to a second surface of the fabric substrate, wherein the outer heat reflective coating comprises nanofillers, wherein the nanofillers are configured to be mixed into the outer heat reflective coating, wherein the outer heat reflective coating further comprises ceramic nanoparticles, and wherein an amount of ceramic nanoparticles in the outer heat reflective coating imparts requisite thermal properties to support at least one of hot air welding or radio frequency welding of the fabric substrate.

2. The composite textile of claim 1, wherein the outer heat reflective coating is configured to be bonded to the fabric substrate.

3. The composite textile of claim 1, wherein the outer heat reflective coating comprises nano metal particles.

4. The composite textile of claim 1, wherein the fabric substrate is comprised of nylon.

5. The composite textile of claim 1, wherein the outer heat reflective coating comprises carbon allotropes.

6. The composite textile of claim 5, wherein the outer heat reflective coating comprises graphite flakes.

7. The composite textile of claim 6, wherein the outer heat reflective coating comprises graphene nanosheets.

8. An aircraft evacuation slide assembly, comprising:
an inert gas inflation system; and
an evacuation slide including an inner surface and an outer surface, wherein the evacuation slide is comprised of a plurality of composite textiles, wherein each composite textile of the plurality of composite textiles is configured to be joined to one another, wherein each composite textile consists of:
a fabric substrate;
an inner polyurethane coating applied to a first surface of the fabric substrate, wherein the inner polyurethane coating is configured for the inner surface of the evacuation slide; and
an outer heat reflective coating applied to a second surface of the fabric substrate, wherein the outer heat reflective coating comprises nanofillers, wherein the nanofillers are configured to be mixed into the outer heat reflective coating, wherein the outer heat reflective coating further comprises ceramic nanoparticles, and wherein an amount of ceramic nanoparticles in the outer heat reflective coating imparts requisite thermal properties to support at least one of hot air welding or radio frequency welding of the fabric substrate.

9. The aircraft evacuation slide assembly of claim 8, wherein the outer heat reflective coating is configured to be bonded to the fabric substrate.

10. The aircraft evacuation slide assembly of claim 8, wherein the outer heat reflective coating comprises nano metal particles.

11. The aircraft evacuation slide assembly of claim 8, wherein the fabric substrate is comprised of nylon.

12. The aircraft evacuation slide assembly of claim 8, wherein the outer heat reflective coating comprises carbon allotropes.

13. The aircraft evacuation slide assembly of claim 12, wherein the outer heat reflective coating comprises graphite flakes.

14. The aircraft evacuation slide assembly of claim 13, wherein the outer heat reflective coating comprises graphene nanosheets.

15. A method of manufacturing an aircraft evacuation slide, comprising:
assembling a plurality of composite textiles, wherein the assembling of each composite textile further comprises:
forming an outer heat reflective coating, wherein the forming further comprises mixing a nanofiller compound in a polyurethane coating, wherein the outer heat reflective coating further comprises ceramic nanoparticles;

applying the outer heat reflective coating to a first surface of a fabric substrate, wherein an amount of ceramic nanoparticles in the outer heat reflective coating imparts requisite thermal properties to support at least one of hot air welding or radio frequency welding of the fabric substrate;

applying an inner polyurethane coating to a second surface of the fabric substrate;

bonding the outer heat reflective coating and the inner polyurethane coating to the fabric substrate; and joining the plurality of composite textiles to one another, wherein the joining is configured to form the aircraft evacuation slide with the inner polyurethane coating forming an inner surface of the aircraft evacuation slide.

16. The method of claim 15, wherein the applying the outer heat reflective coating further comprises coating the fabric substrate with the outer heat reflective coating, wherein the applying the inner polyurethane coating further comprises coating the fabric substrate with the inner polyurethane coating.

17. The method of claim 15, wherein the joining further comprises the radio frequency welding each composite textile of the plurality of composite textiles to one another.

18. The method of claim 15, wherein the joining further comprises the hot air welding each composite textile of the plurality of composite textiles to one another.

* * * * *